United States Patent

Kadono

[15] 3,686,515

[45] Aug. 22, 1972

[54] SEMICONDUCTOR MEMORY

[72] Inventor: Shinji Kadono, Hatano, Japan

[73] Assignee: Hitachi, Ltd., Tokyo, Japan

[22] Filed: Dec. 24, 1970

[21] Appl. No.: 101,293

[52] U.S. Cl. ..................307/238, 307/247, 307/254, 307/291

[51] Int. Cl............................................H03k 17/00

[58] Field of Search......307/247, 238, 291, 235, 254; 330/30 D

[56] References Cited

UNITED STATES PATENTS

| | | | |
|---|---|---|---|
| 3,284,640 | 11/1966 | Lindell | 307/247 |
| 3,471,715 | 10/1969 | Castelli | 330/30 D |
| 3,328,724 | 6/1967 | Way | 307/247 |
| 3,223,853 | 12/1965 | Charbonnier | 307/247 |
| 2,892,103 | 6/1959 | Scarbrough | 307/247 |

FOREIGN PATENTS OR APPLICATIONS

| | | | |
|---|---|---|---|
| 966,706 | 8/1959 | England | 307/247 |

*Primary Examiner*—Rudolph V. Rolinec
*Assistant Examiner*—David M. Carter
*Attorney*—Craig, Antonelli & Hill

[57] ABSTRACT

A low power consuming semiconductor memory in which a pair of input/output terminals of a flip-flop are connected with the bases of a pair of transistors the collectors of which are connected to a pair of digit lines. The emitters of the transistors are connected in common with a constant current source through a current switching type semiconductor switching circuit which is adapted to be closed or opened in response to application or non-application thereto of an address signal, so that the flip-flop is self-sustained by its proper voltage source while the address signal is not present.

9 Claims, 2 Drawing Figures

INVENTOR

SHINJI KADONO

BY Craig, Antonelli, Stewart & Hill
ATTORNEYS

SEMICONDUCTOR MEMORY

BACKGROUND OF THE INVENTION

1. Field of the Invention

The present invention relates to a memory circuit for use in general electronic equipment, and more particularly to a low power consumption semiconductor memory circuit which is effective when used in high speed electronic computers.

2. Description of the Prior Art

A semiconductor memory, in particular a semiconductor integrated circuit memory includes one or more semiconductor memory circuits (hereinafter referred to as a memory cell) as a unit to which digit lines and an address line are connected.

When information is to be selectively written in or read out of any of the memory cells, an address signal is supplied to a selected memory cell through its address line so that the selected cell is only actuated to be capable of receiving information from or reading the information out of the selected memory cell through its digit line.

Such a memory cell as supplied with an address signal as stated above is identified as being in a "selected state". A memory cell which is not supplied with an address signal is in a "non-selected state".

In a conventional integrated circuit memory, however, a considerable current must always be supplied to each memory cell through the digit lines or address line regardless of whether each memory cell is in the "selected state" or in the "non-selected state". Consequently, the conventional integrated circuit memory has the disadvantage that it consumes a large amount of power. Generally, in an integrated circuit memory, since most memory cells are in the "non-selected state" at any time, the power consumed by the whole integrated circuit memory can be considerably reduced if the current flowing through the memory cells in the "non-selected state" can be limited. However, the conventional memory cell has the disadvantage that if the current flowing through the memory cell in the "non-selected state" is intended to be reduced, the current which is to flow through the digit line when the memory cell is in the "selected state", in particular when reading out is being effected decreases to impair the reading out.

SUMMARY OF THE INVENTION

An object of the present invention is to provide a semiconductor memory which is reduced in its overall power consumption by reducing the power consumption of its component memory cell when it is in the "non-selected state".

Another object of the present invention is to provide a semiconductor memory which is capable of allowing a sufficiently high current to flow through the digit line in a memory cell when it is in the "selected state", in particular when reading out is to be effected.

Briefly, the present invention is a semiconductor memory comprising at least one memory cell constituted such a manner that the bases of a pair of transistors the emitters of which are connected in common are connected to a pair of input/output terminals of a memory bistable circuit, such as flip-flop, respectively, the common emitter of the pair of transistors being connected to a constant current source through a switch which is actuated by a signal on an address line, the collectors of the pair of transistors being connected with a pair of digit lines, respectively.

DESCRIPTION OF THE PREFERRED EMBODIMENT

A description will first be made of the basic construction of a memory cell of the semiconductor memory according to the present invention.

Figure 1:
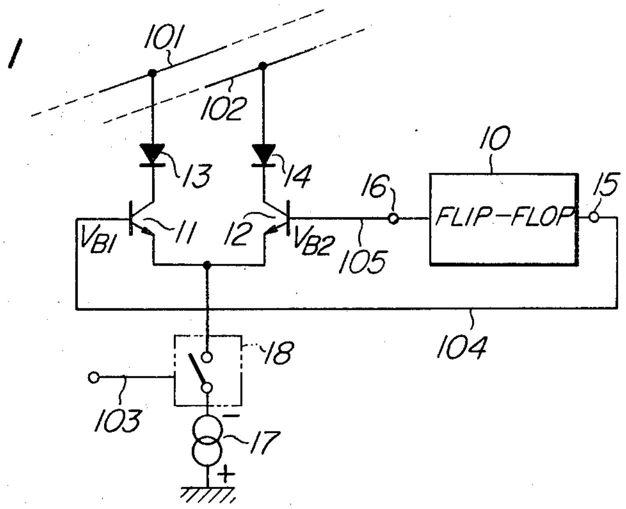
FIG. 1 is a circuit diagram showing the basic construction of the present invention.

Referring to FIG. 1, there is illustrated a memory cell which comprises a memory bistable circuit 10 (hereinafter referred to as a flip-flop) having a pair of input/output terminals 15 and 16, a pair of transistors 11 and 12 the emitters of which are connected in common, a pair of diodes 13 and 14 connecting the collectors of the pair of transistors 11 and 12 to a pair of digit lines 101 and 102, respectively, a pair of lead wires 104 and 105 connecting the bases of the pair of transistors 11 and 12 to the pair of input/output terminals 15 and 16 of the flip-flop 10, respectively, a constant current source 17, and a switch 18 connecting the common emitter of the transistors 11 and 12 to the constant current source 17.

The switch 18 is of the normally open type, and closed by an address signal supplied thereto through an address line 103 connected thereto.

The flip-flop 10 must be such a one that a current is allowed to flow into or out of it through either one of the pair of input/output terminals 15 and 16 to invert its stable state depending on the values of the potentials $V_{B1}$ and $V_{B2}$ at the bases of the pair of transistors 11 and 12.

The diodes 13 and 14 are for the purpose of preventing any current from flowing from the memory cell into the digit lines 101 and 102.

An embodiment of the present invention will next be described with reference to FIG. 2.

Figure 2:
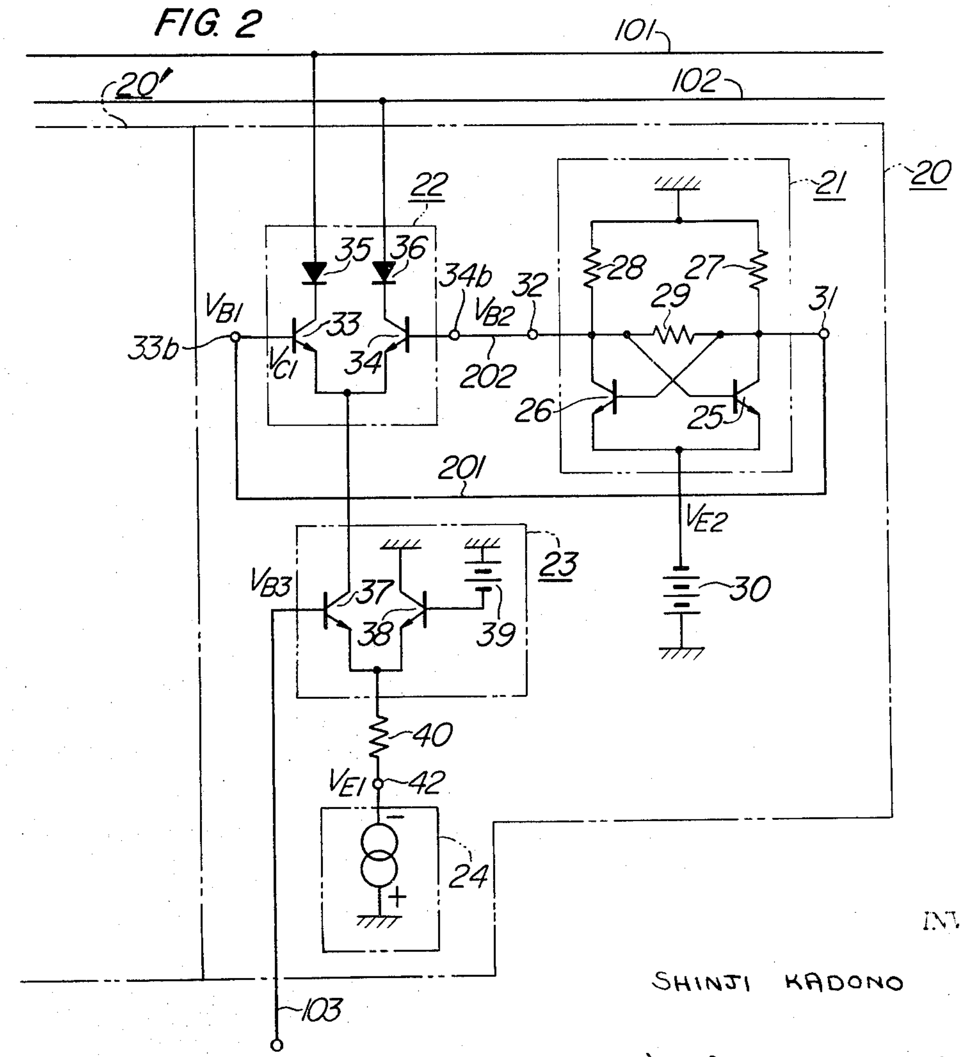
FIG. 2 is a circuit diagram showing an embodiment of the present invention.

In FIG. 2 there is provided a semiconductor memory which comprises a multiplicity of memory cells 20, 20', . . . (only two cells 20, 20' are shown). They are of the same construction, so that hereinafter a description will be made of the memory cell 20 only.

Numeral 21 designates a flip-flop for storing information of well known structure, wherein the emitters of a pair of transistors 25 and 26 are connected in common with a negative voltage source 30, the base of each of the transistors 25 and 26 is connected with the collector of the other transistor, and the collectors of the transistors 25 and 26 are grounded through resistors 27 and 28, respectively, and at the same time connected with each other through a resistor 29. The flip-flop 21 further has input/output terminals 31 and 32 connected with the collectors of the transistors 25 and 26, respectively.

A coupling circuit 22 which is one of the features of the present invention comprises a pair of transistors 33 and 34 the bases of which are connected in common with a switching circuit 23. The collectors of the transistors 33 and 34 are connected with a pair of digit lines 101 and 102 through diodes 35 and 36, respectively. The bases 33*b* and 34*b* of the transistors 33 and 34 are connected with the input/output terminals 31 and 32 of the flip-flop 21 by means of lead wires 201 and 202, respectively.

The switching circuit 23 is the well known current switching type. The emitters of a pair of transistors 37 and 38 are connected in common with a constant current source 24 through a resistor 40. The base of the transistor 38 is connected with a negative reference voltage source 39, and the collector of the transistor 38 is grounded. The collector of the transistor 37 is connected with the common emitter of the pair of transistors 33 and 34 of the coupling circuit 22, and the base of the transistor 37 is connected with an address line 103.

Thus, the pair of digit lines 101 and 102 are connected with the transistors 33 and 34 of the coupling circuit 22 which in turn is connected with the memory flip-flop 21. The coupling circuit 22 is further connected in series with the constant current source 24 through the switching circuit 23.

The reference voltage of the switching circuit 23, i.e. the base potential of the transistor 38 is set to be −1.6V, the emitter source voltage $V_{E1}$, at one end 42 of the constant current source 24 connected with the common emitter of the transistors 37 and 38 of the switching circuit 23 is set to be −4.5V, and the emitter source voltage $V_{E2}$ at the common emitter of the pair of transistors 25 and 26 of the flip-flop 21 is set at −1.0V.

The values of the resistors 27, 28, 29 and 40 are all selected to be 1KΩ.

The pair of digit lines are normally set at +0.3V in order not to render the pair of transistors 33 and 34 in the saturated states.

Further, in order to maintain the memory cell 20 in the "non-selected state" the potential of the address line 103 is set at −2.0V.

Thus, the present invention is featured in that when the memory cell 20 is in the "non-selected state", the memory flip-flop 21 is maintained in the stable state by the voltage source 30 so that any current flows from the flip-flop 21 to neither of the digit lines 101 and 102 nor the address line 103.

Now assuming that the transistor 26 is in the conducting state and the transistor 25 is in the nonconducting state, the potential $V_{B1}$ of the base 33*b* of the transistor 33 is higher than the potential $V_{B2}$ of the base 34*b* of the transistor 34. The operation of writing information in the memory cell 20 which is in such an initial state is performed by the following processes.

1. The transistor 37 is switched to the conducting state by raising the potential of the address line 103, i.e. the base potential $V_{B3}$ of the transistor 37 from −2.0V to −1.2V to connect the coupling circuit 22 with the constant current source 24. Then, since the base potential $V_{B1}$ of the transistor 33 is higher than the base potential $V_{B2}$ of the transistor 34, the transistor 33 instantaneously switches into the conducting state to allow a current to flow from the digit line 101 to the constant current source 24 through the diode 35 and the transistor 33.
2. The potential of the digit line 102 is maintained at +0.3V so that the transistor 34 is not saturated even when the flip-flop 21 is inverted as stated in the following process (3), and the potential of the digit line 101 is lowered from +0.3V to −0.5V. Consequently, the collector potential $V_{C1}$ of the transistor 33 becomes sufficiently lower than the base potential $V_{B1}$ thereof. As a result, the emitter junction and the collector junction of the transistor 33 are both biased in the forward direction; thus the transistor 33 becomes saturated.
3. When the transistor 33 becomes saturated, a current starts flowing from ground to the constant current source 24 through the resistor 27, the input/output terminal 31 of the flip-flop 21, and the emitter junction of the transistor 33. Consequently, the transistor 25 becomes conductive due to the variation in the current through the collector resistor 27 of the transistor 25, and simultaneously the transistor 26 becomes nonconductive. Thus, the state of the flip-flop 21 is inverted and information is written therein. Upon completion of the above mentioned writing procedure the transistor 34 becomes conductive because of the base potential $V_{B2}$ of the transistor 34 is higher than the base potential $V_{B1}$ of the transistor 33. However, the transistor 34 does not switch into the saturated state since the potential of the digit line 102 is sufficiently higher than the base potential $V_{B2}$ of the transistor 34. Consequently, a current which flows into the transistor 34 from the input/output terminal 32 of the flip-flop 21 is very slight, so that the state of the flip-flop 21 is not inverted again.
4. The potential of the digit line 101 is restored to the sufficiently high value, +0.3V.
5. The switch 23 is turned off by lowering the potential of the address line 103 to −2.0V to cut off the current flowing from the coupling circuit 22 to the constant current source 24. Thus, the writing operation has been completed.

If the switch 23 is not turned on in the above process (1), the above-described writing operation is not performed even if the potential of the digit line 102 is maintained at a high level and the potential of the digit line 101 is made low as stated in the process (2). This is because a current does not flow from the flip-flop 21 to the constant current source 24 through the emitter junction of the transistor 33 due to the off state of the switch 23, nor does a current flow from the flip-flop 21 to the digit line 101 through the collector junction of the transistor 33 due to the presence of the diode 35.

The power consumed by the memory cell according to the present invention when it is in the "non-selected state", i.e. in the off state of the switch 23, that is, the power necessary for the flip-flop 21 to maintain information can be remarkably reduced which leads to a reduction of the power consumption by the whole integrated circuit memory.

The reading operation of the memory cell 20 is performed in the following processes:

1. While the potentials of the digit lines 101 and 102 are maintained at a level which does not saturate the transistors 33 and 34, about +0.3V, the potential of the address line 103, i.e. the base potential of the transistor 37 is raised from −2.0V to −1.2V to make the transistor 37 conductive, whereby the coupling circuit 22 is connected to the constant current source 24.

2. Either one of the transistors 33 and 34 of the coupling circuit 22 becomes conductive depending on the stored contents of the flip-flop 21, that is, which of the transistors 25 and 26 is in the conducting state.

If the transistor 25 is in the non-conductive state, the transistor 33 becomes conductive because the base potential $V_{B1}$ of the transistor 33 is higher than the base potential $V_{B2}$ of the transistor 34. Consequently, a current flows from the digit line 101 to the constant current source 24 through the diode 35, transistor 33 and transistor 37. Thus, if the variation in the current or voltage in the digit line 101 is detected, the reading-out is effected.

3. Then, the transistor 37 is made nonconductive by lowering the potential of the address line 103 from −1.2V to −2.0V to cut off the coupling circuit 22 from the constant current source 24. Thus the reading operation has been completed.

According to the above-described construction of the present invention, a sufficient current for reading out can be provided because the current of the constant current source 24 flows through the digit line without being impeded.

In the embodiment of FIG. 2, the power consumed by the memory cell 20 in the "non-selected state" is about 1 mW, and the current which flows through the digit line at the time of reading operation is about 2.5 mA. Compared with a power of about 6 mW consumed by the conventional memory cell to provide a read current of about 2.5 mA, the power consumption is reduced to about one sixth according to the present invention.

The above-described arrangement can be similarly operated even if the polarities of the circuit components, voltages and currents are reversed.

Further, the memory flip-flop 21 and switching circuit 23 are not limited to those shown in FIG. 2, but any circuits performing similar functions can also be employed in the present invention.

I claim:

1. A semiconductor memory comprising:

a bistable memory cell having two storage elements with two input/output terminals, and having flip-flop characteristics;

a power supply connected to said memory cell for maintaining the state of said bistable memory cell while said memory cell is in the non-selected state;

a coupling circuit comprising a pair of transistors, the emitters of which are connected with each other and the bases of which are connected with the input/output terminals of said memory cell, respectively;

means for connecting a pair of digit lines with the collectors of said pair of transistors, respectively;

a normally open switch connected with an address line and operatively switched on and off in response to variations in an address signal applied thereto through said address line, whereby said memory cell becomes selected when said switch is in the on-state; and a constant current source connected via said switch with said commonly connected emitters of said pair of transistors.

2. A semiconductor memory according to claim 1 wherein said bistable memory cell comprises a pair of memory transistors, the emitters of which are connected in common with said power supply, the base of each one of said memory transistors being connected to the collector of the other, a coupling resistor inserted between the collectors of said pair of memory transistors, and a pair of resistors connected with the collectors of said memory transistors for supplying an operation voltage therethrough to said memory transistors, said input/output terminals being connected with said collectors of said memory transistors, respectively.

3. A semiconductor memory according to claim 1, wherein said connecting means comprises a pair of diodes inserted between said digit lines and the collectors of said transistors of the coupling circuit in a direction to prevent a forward current from flowing through a base-collector junction of said transistors of the coupling circuit.

4. A semiconductor memory according to claim 1, wherein said switch is a current switching type semiconductor switch comprising a pair of transistors, the emitters of which are connected in common with said constant current source, the collector and base of one of which are connected with said common emitter of said transistors of said coupling circuit and said address line, respectively, and the base of the other of which is supplied with a reference voltage to actuate said switch depending on whether said address signal is higher than said reference voltage or not.

5. A semiconductor memory comprising: a bistable flip-flop having first and second storage elements with first and second input/output terminals connected thereto;

means for coupling the input/output terminals to a pair of digit lines comprising a coupling circuit having a pair of transistors, the emitters of which are connected together and the bases of which are connected to the input/output terminals of said bistable flip-flop respectively;

means for connecting said pair of digit lines with the collectors of said pair of transistors of said coupling circuit, respectively;

means for maintaining one of the bistable states of said flip-flop during the period of time when said input/output terminals are decoupled from said digit lines;

means, responsive to an address signal on an address line connected thereto, and being connected to said coupling circuit, for effecting the coupling of said digit lines with said input/output terminals of said flip-flop, said coupling effecting means comprising a normally-open switch connected between said address line and said coupling circuit; and a constant current source connected via said normally-open switch, with the connected together emitters of said pair of transistors.

6. A semiconductor memory according to claim 5, wherein said flip-flop comprises a pair of memory transistors, the emitters of which are connected in common with said maintaining means, the base of each one of said memory transistors being connected to the collector of the other, a coupling resistor inserted between the collectors of said pair of memory transistors, and a pair of resistors connected with the collectors of said memory transistors for supplying an operation voltage therethrough to said memory transistors, said input/output terminals being connected with said collectors of said memory transistors, respectively, and wherein said maintaining means comprises a power supply.

7. A semiconductor memory according to claim 5, wherein said connecting means comprises a pair of diodes inserted between said digit lines and the collectors of said transistors of the coupling circuit in a direction to prevent a forward current from flowing through a base-collector junction of said transistors of the coupling circuit.

8. A semiconductor memory according to claim 7, wherein said switch is a current switching type semiconductor switch comprising a pair of transistors, the emitters of which are connected in common with said constant current source, the collector and base of one of which are connected with said common emitter of said transistors of said coupling circuit and said address line, respectively, and the base of the other of which is supplied with a reference voltage to actuate said switch depending on whether said address signal is higher than said reference voltage or not.

9. A semiconductor memory according to claim 5, wherein said switch is a current switching type semiconductor switch comprising a pair of transistors, the emitters of which are connected in common with said constant current source, the collector and base of one of which are connected with said common emitter of said transistors, of said coupling circuit and said address line, respectively, and the base of the other of which is supplied with a reference voltage to actuate said switch depending on whether said address signal is higher than said reference voltage or not.

* * * * *

UNITED STATES PATENT OFFICE

CERTIFICATE OF CORRECTION

Patent No. 3,686,515 Dated August 22, 1972

Inventor(s) Shinji KADONO

It is certified that error appears in the above-identified patent and that said Letters Patent are hereby corrected as shown below:

Page 1, left hand column, please add the following item [ 30 ]

-- Foreign Application Priority Data

December 26, 1969 Japan 104268/69 --

Signed and sealed this 29th day of May 1973.

(SEAL)
Attest:

EDWARD M.FLETCHER,JR.
Attesting Officer

ROBERT GOTTSCHALK
Commissioner of Patents